Aug. 4, 1942.    C. G. LEMON    2,292,230
MEANS FOR COLOR COMPARISON
Filed April 24, 1940    4 Sheets-Sheet 1

INVENTOR
CECIL GEORGE LEMON
BY *Norris & Bateman*
ATTORNEYS

Aug. 4, 1942.　　　　C. G. LEMON　　　　2,292,230
MEANS FOR COLOR COMPARISON
Filed April 24, 1940　　　4 Sheets-Sheet 2

INVENTOR
CECIL GEORGE LEMON
BY Norris & Bateman
ATTORNEYS

Aug. 4, 1942.   C. G. LEMON   2,292,230
MEANS FOR COLOR COMPARISON
Filed April 24, 1940   4 Sheets-Sheet 3
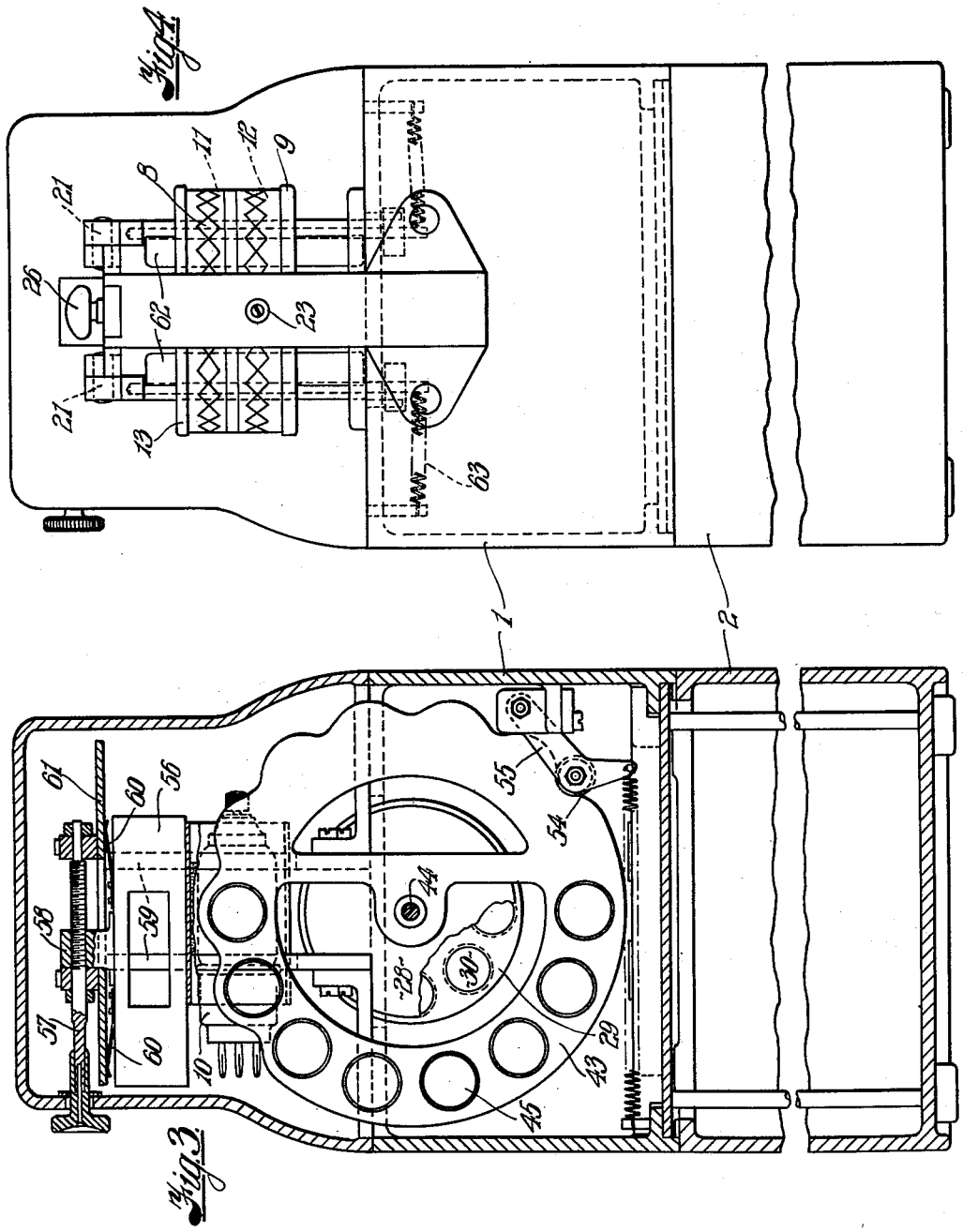
INVENTOR
CECIL GEORGE LEMON
BY Norrie & Bateman
ATTORNEYS Patented Aug. 4, 1942

2,292,230

UNITED STATES PATENT OFFICE 2,292,230

MEANS FOR COLOR COMPARISON

Cecil George Lemon, Chiswick, London, England

Application April 24, 1940, Serial No. 331,486
In Great Britain April 25, 1939

18 Claims. (Cl. 88—14)

This invention relates to improvements in means for color comparison, and has more particular reference to the type employing a light sensitive cell in which the color of reference or for test is compared with a standard.

The term "color" herein is used in a generic sense and covers the reflection of the hues of the spectrum, including where the context so implies both white and black and modifications of the two latter hues.

Heretofore this type of measuring instrument has left much to be desired and especially when dealing with ceramic clays, paint powders, flour and similar milled products and pharmaceutical preparations and the like in which fine gradations of color or color absence determine quality or market value.

Photoelectric cells have for a long time been used for this purpose, and so called standard lamps employed for comparative purposes. Since, however, in any system of electric distribution there is liable to be a voltage change, and with any primary or secondary cell the voltage changes from full charge or energisation to exhaustion, it follows that the light of a standard lamp, which in all types depends upon voltage for light constancy, cannot be maintained. Thus suppose a circuit of supply at 220 volts and a drop of only 2.2 volts. This drop is equivalent to 1% in light value, or if such a voltage drop occurs in the region of the critical voltage of the lamp, the drop in light value may be more. Some other systems depend upon daylight values and the eye, and in this case two variables both of uncertain values are employed instead of one.

The object of the present invention is to provide means that eliminate any uncertain value and obtain a direct and true measurement of color or absence of color value from a light source, that need only be constant during the time of test, and that has no necessity to be of standard dimensions.

A further object of the invention is to obtain a standard surface for powdered materials for the purpose of test whereby comparison is at all times equal for similar matter, and wherein the means employed can deal with all color values apart from white or modified white color.

The comparison of the color of reference with the standard employing the apparatus according to the invention is carried out by illuminating the standard and the color of reference from a common light source and exposing a photoelectric device to the standard and color of reference in alternate succession repeated at such frequency as to produce an alternating current response whose amplitude is a measure of the difference in brightness between the color of reference and the standard. By arranging that the frequency of the alternations is within the audible range and transmitting the output of the photo electric device to a sound reproducer, aural or measurable electrical detection may be provided to ascertain differences between the color of material under test and the color of the standard material.

The invention also provides means for obtaining a variable color reference by interposing one or more colored and/or neutral tinted screens in the path of the light from the light source to the light-sensitive device and means for measuring the brightness of a color to be tested by inserting standard screens in the light path between the light and a standard surface until a balance is achieved between the brightness of the standard surface and that of the substance under test.

In order that the invention may be more fully understood, reference is made to the accompanying drawings wherein a preferred embodiment of the invention is shewn and wherein:

Fig. 3 is a part sectional side elevation in Fig. 1 on line 3—3.

Fig. 4 shews details of the cage.

Figure 5:
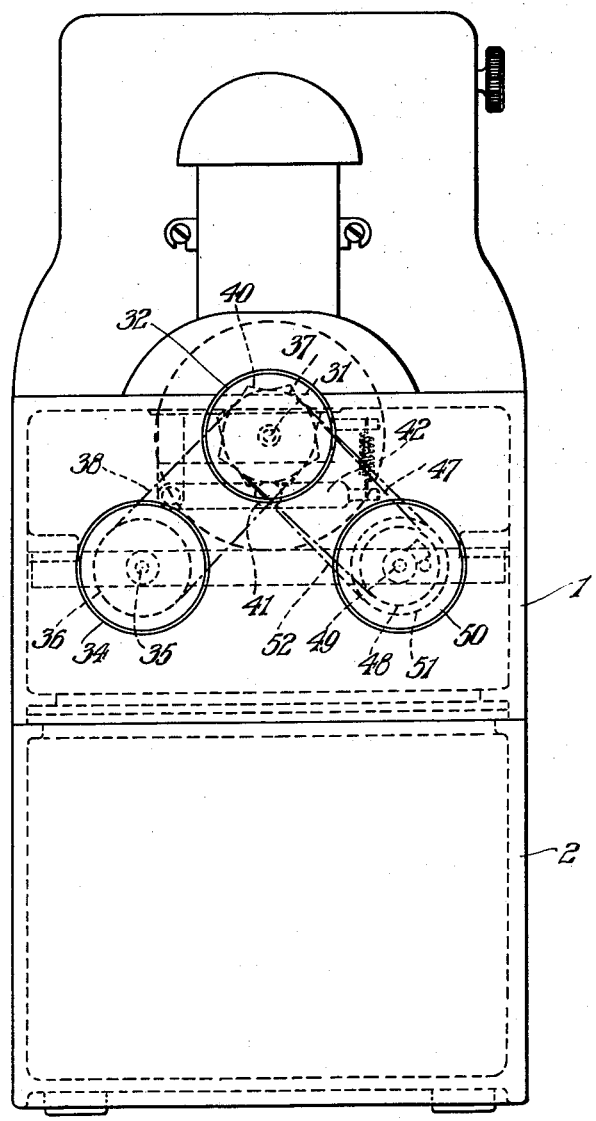

Fig. 5 is a view shewing the method of coupling the adjustment devices.

Figure 6:
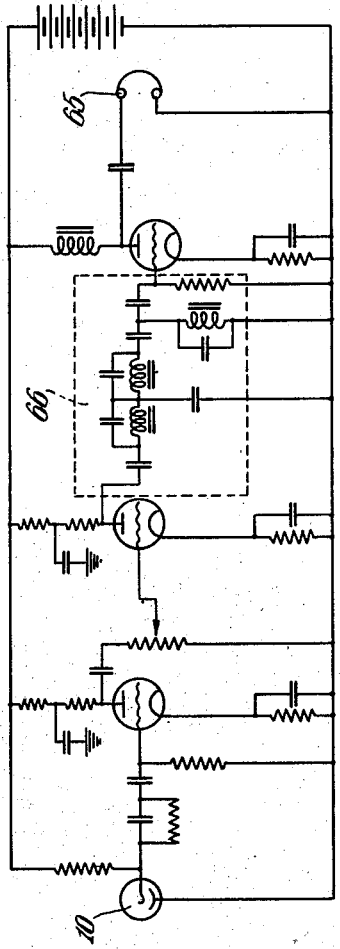

Fig. 6 is a diagrammatic view of the arrangements proposed for amplifying the currents received from the photoelectric cell.

Figure 1:
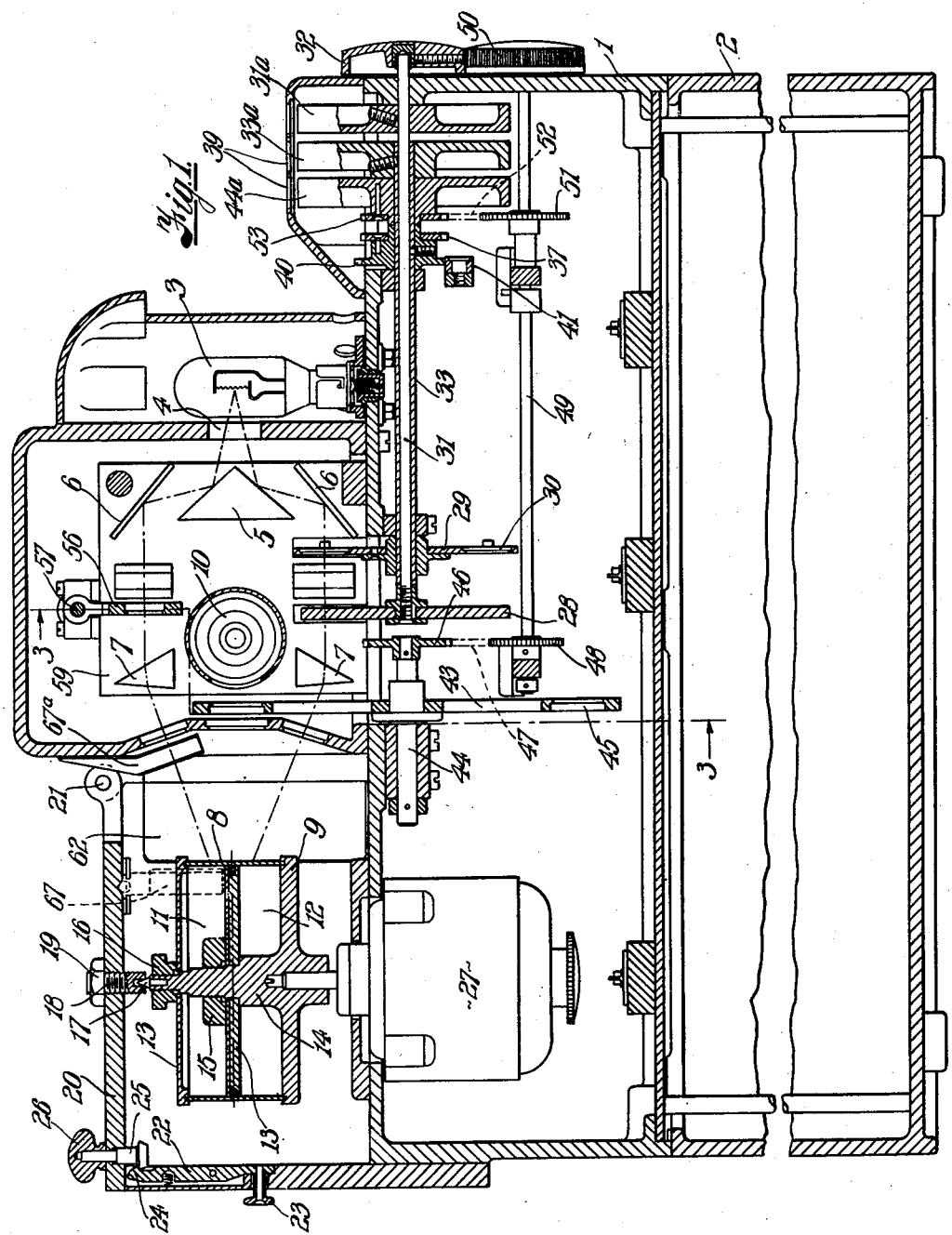
Fig. 1 is a part sectional side elevation of the invention, the sound amplifying device being omitted.

Referring to the drawings and especially to Fig. 1, a casing 1 is provided to contain or support the devices constituting the optical part of the invention. The casing 1 is mounted upon a second casing 2 which may conveniently contain the electrical and screened sound amplifying devices and be fitted with terminals (not shewn) for coupling to ear 'phones or other electrical indicating devices.

A light source 3 is provided, the beam of light therefrom passing through a narrow slit window 4 on to a prism 5. The prism divides the beam of light and passes it in two parallel beams by interposition of the reflectors 6. The beams are then deflected by means of opposed prisms 7 so as to be caused to impinge upon the windows 8, see Fig. 4, of the rotary cage 9. From these windows light is reflected on to the photo-electric cell 10. The cage 9 is formed with two compartments 11 and 12, these compartments being covered by removable lids or covers 13. The cage 9 is truly circular at its periphery and the wall material is optically ground glass, a transparent synthetic resin or the like, the wall preferably being made from seamless tubing, so that no joint occurs over any portion of its surface. The windows 8 are formed by obscuring a part of the transparent wall of the cage leaving clear panes or windows, the windows of one compartment being staggered relative to the windows of the other compartment and all the windows being so dimensioned that the sum of both window areas in any vertical plane is constant.

The compartments 11 and 12 are co-axial and surround a stepped stem 14 located centrally of the cage, the cover 13 of the lower chamber 12 being secured in position on said stem by a nut 15, and the upper cover being secured in position on said stem by a nut 16. The stem 14 is preferably formed with a coned top 17 which is held rigidly in position by a correspondingly shaped set screw 18 adjustable as at 19 and mounted in a cross bar 20. The bar 20 is hinged on a pin 21 and is held in operative position by means of a releasable, spring-controlled rocking lever 22 having a finger knob 23 and a hook 24 engaging the head of a pin 25, the latter being held in position upon the bar 20 by wing nut 26.

The cage 9 is rotated preferably by a synchronous or constant speed electric motor 27, the spindle of which extends into and is secured to the stem 14 of the cage.

An annular obscuring wedge 28 and a coaxially mounted disc 29 carrying a ring of obscuring screens 30 are arranged between the lower reflector 6 and the lower prism 7, so that the lower beam of light passing from the reflector to the prism also passes through said annular wedge and one of said obscuring screens. The annular wedge 28 is graduated to give from 0–9 units or degrees of opacity whilst the first obscuring screen 30 is clear and the remainder have successively increasing densities, each density being 10 units of opacity greater than the preceding density. The annular wedge is carried upon a spindle 31 extending through the casing 1 and having a knob 32 on the end thereof for manual operation, whilst the disc 29 is carried by a hollow shaft 33 embracing the spindle 31, said disc being set or adjusted by a knob 34 fixed on a spindle 35, which also carries a sprocket wheel 36 driving a sprocket wheel 37 on the hollow shaft by a chain 38. The spindle 31 and hollow shaft 33 each carry a reference wheel 31a and 33a respectively, bearing dial markings around their peripheries, said markings being visible through windows 39 aligned in the casing 1 so that the exact degree of obscuration of color difference can be read as the knobs are adjusted. The hollow shaft 33 also carries a star-wheel 40 which is engaged at its periphery by a roller 41 carried on a spring-controlled lever 42 (see Fig. 5), said mechanism serving to ensure that the disc 29 is always correctly positioned with one of the obscuring screens 30 in the path of the lower light beam.

To obtain color values other than white, means are provided for interposing standard color filters in the reflected beam path to the photo cell, said means comprising a disc 43 mounted on a shaft 44 and carrying a ring of standard color filters 45 adapted to be selectively positioned in front of the photo cell 10. The shaft 44 carries a sprocket wheel 46 connected by chain 47 with a sprocket wheel 48 mounted on a spindle 49, the latter being manually rotatable by means of a knob 50. A second sprocket wheel 51 on the spindle 49 drives, through a chain 52 and a sprocket wheel 53, a further reference wheel 44a bearing color indications, said reference wheel indices also being visible through a window in the casing. A roller 54 carried by a spring-controlled lever 55 rides upon the periphery of the disc 43, which is of waved formation, and operates to ensure correct positioning of the disc in a similar manner to the mechanism 40, 41, 42.

In order to ensure that the two beams of light striking the revolving cage are of equal light value, an adjustable obscuring screen or wedge 56 is provided for modifying the upper beam of light. The screen 56 is mounted for transverse movement across the beam of light passing from the reflector 6 to the prism 7, being actuated by a manually rotatable rod 57 having screw-threaded engagement with a boss 58 secured to the screen. The screen is guided in slots formed in the frame members 59 supporting the optical system, and is held in engagement with the bottoms of the slots by leaf springs 60 secured to the upper edge of the screen and bearing against a fixed cross member 61.

Figure 2:
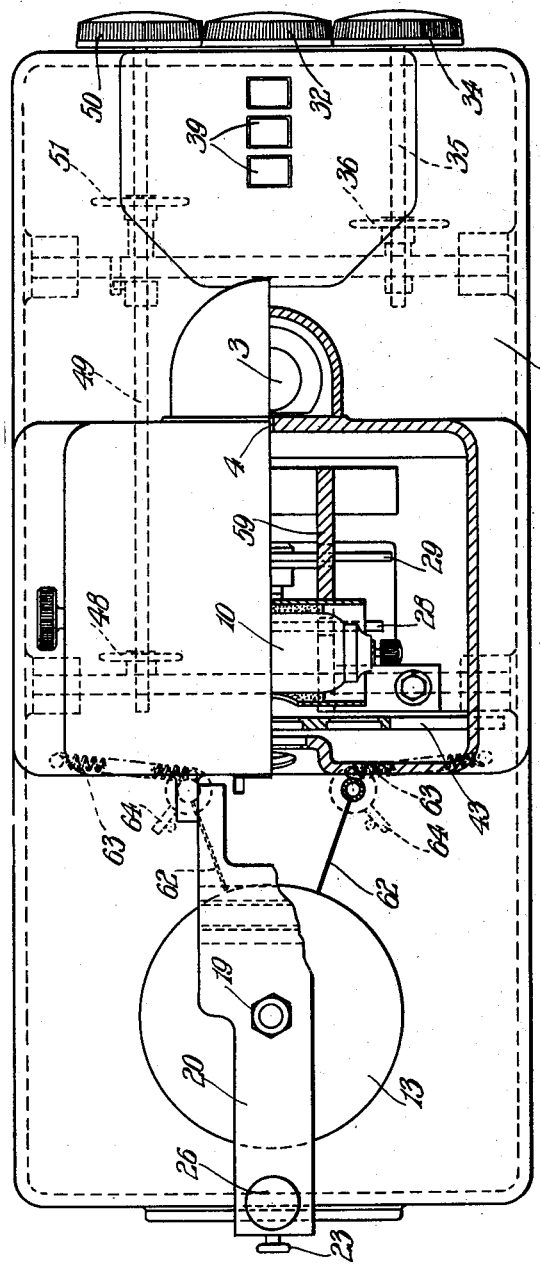
Fig. 2 is a part sectional plan of Fig. 1.

Non-reflecting shutters 62 are arranged on either side of the beams of light passing from the optical system to the rotating cage to prevent extraneous light being reflected by the cage on to the photo cell, the shutters being pivotally mounted adjacent the optical system housing so that they may be swung to an inoperative position against the housing when desired. Springs 63 co-operate with stops 64 to hold the shutters in their operative positions as shown in Fig. 2.

In the apparatus above described the speed of rotation of the cage 9 and the spacing of the windows 8 are so chosen that the light interruption produces in the photo cell an alternating current response of a frequency within the audible range. The output of the photo cell is amplified and transmitted to a sound reproducer to provide for aural detection. A suitable form of electric amplifier circuit is shewn in Fig. 6. This circuit is of known type providing with resistance capacity coupling three stages of amplification between the photo cell 10 and the sound reproducer 65 and includes an audio frequency filter circuit 66 designed to pass the frequency produced in the photo cell and to eliminate all other frequencies.

The method of operating the apparatus will now be described.

Before the instrument can be put to use, it is necessary to adjust the optical system so that the two light beams have equal intensity or light value. For this purpose the two compartments 11, 12 of the cage are charged with quantities of the same substance, the disc 43 is adjusted to position a clear neutral screen in front of the photo cell and the cage is rotated. The obscuring screen 56 and/or the annular wedge 28 and disc 29 is or are then adjusted until no audible note can be detected in the sound reproducer thus indicating that the alternating currents produced in the photo cell by the two reflected beams of light, which by reason of the staggered arrangement of the windows 8 are 180 degrees out of phase, are equal and therefore that the light beams themselves are equal. The instrument having once been set in this manner and the positions of the annular wedges 28 and disc 29, if used, noted by the reading on the reference wheels 31a, 33a, no subsequent readjustment prior to test is necessary.

To ascertain the degree of discoloration of a milled product such as flour, the lower compartment 12 of the cage 9 is charged with a substance having the desired standard color; for a pure white, barium sulphate is the most suitable substance, and the material to be tested is charged into the upper compartment 11. The cage is then rotated throwing the material into engagement with the sides of the cage by centrifugal force, and each light beam periodically reflected from the cage sets up an alternating current in the photo cell, the two currents being 180° out of phase. As a result there is produced an alternating current response whose amplitude is a measure of the difference in brightness between the color of the substance under test and the standard, and which may be detected as an audible note in the sound reproducer. The annular wedge 28 and obscuring screens 30 are then manipulated until the audible note has been eliminated and the dial markings observable on the reference wheels 31a, 33a give the comparison between purity of color and degrees of off-color.

Where it is desired to ascertain the color of discoloration, the color standard filters 45 are used. These filters are arranged in sequence around the disc 43 in the order of their color density and are passed successively in front of the photo cell until the audible note has been eliminated.

By the use of a rotating body a constant surface of the powdered material under test is obtained, as the material is pressed by centrifugal force against the inner wall of the rotating body with a constant pressure which will be equal for equal specific gravities for the standard and tested materials. Where, however, the quantity of material to be tested is insufficient to charge the chamber 11, it may be placed in a separate container 67, see Fig. 1, having an open front or transparent front wall conforming in contour to the cage periphery, the said container, after removal of the lid 13, being positioned within the chamber 11 immediately behind the portion of the wall upon which the upper light beam falls. The container 67 is removably mounted upon the hinged bar 20 and the mounting means preferably include a spring-pressed ball and socket or the like for ensuring accurate positioning of the container within the cage.

Owing to the fact that the windows or panes are staggered the interrupted light from the one side is exactly counterbalanced by the interrupted light from the other side, so that an alternating current is obtained from each side, but they are exactly 180° out of phase and therefore when the two illuminations falling on to the cell are equal in value, no alternating current is produced. The production of the necessary balance is obtained by movement of the optical wedge.

For the above operation it is, of course, necessary that the number of panes on the periphery of the rotating body be such that in conjunction with the speed of the rotating body an audible frequency is obtained after amplification. When the turning knob 32 is operated, the optical wedge 28 is moved and the dial marking on the wheel 31a when the sound is absent gives a comparison on the calibrated scale between purity of color and degrees of off color.

While the invention has been described in relation to color test by sound, it is possible by suitable electrical amplification to measure the alternating current output upon a suitable measuring instrument in lieu of sound measuring.

To measure the color present in liquids a concentric standard white annular wall is interposed about the central pillar of each cage compartment, the liquid of comparison for the white range standard being freshly distilled and de-aerated water which is placed in the lower cage 12, whilst the liquid to be tested is placed in the upper container 11, the covers of the respective cages being made liquid tight, the operation of testing being the same as that described for powdered materials.

Alternatively a transparent receptacle which may be slipped in the holder 67a can be filled with any liquid which it is required to measure, the cage of the material for comparison being filled with distilled water, or left empty when the standard of comparison is air only. The measurement and reading are noted when the receptacle is empty and when filled.

I claim:

1. Means for color comparison, comprising a circular cage having means supporting it for rotation on its central axis and having two axially displaced compartments capable of separately holding the material for test and a standard material, windows in the peripheries of said compartments, means for rotating the cage, a light source, means for dividing light from said source into two separate beams and for directing said beams onto the peripheries of said compartments to illuminate the materials appearing at the windows of the respective compartments and thereby cause said materials to reflect beams of light therefrom, a photo-electric cell positioned relatively to said cage to receive the beams of light reflected from the windows of said compartments as the latter revolve, electrical amplifying means adapted to receive the alternating current response of the photo-electric cell and augment the same to detect color differences, means to regulate the amount of light passing to the standard material, and means responsive to said amplifying means to produce an indication when balance of color is obtained.

2. Means for color comparison as claimed in claim 1 wherein the windows of said compartments are relatively staggered, and wherein said light dividing and beam directing means comprises a prism for dividing light from said source into beams, reflectors for directing said beams toward said cage, and prisms positioned to receive said beams independently and to separately converge them onto the staggered windows of the respective compartments, and means to regulate the amount of light passing to the material for test.

3. Means for color comparison as claimed in claim 1 wherein said means to regulate the amount of light passing to the standard material comprise an optical wedge, and means for adjusting said wedge to regulate the degree of obscurity pertinent to said wedge and thereby produce balance between the effects of the light beams passing to the standard material and to the material for test.

4. Means for color comparison as claimed in claim 1 wherein said means to regulate the amount of light passing to the standard material comprise a plurality of optical screens of different density values the highest of which is a multiple of the lowest, and indicating means to give a reading of any color balance adjustment of said screens.

5. Means for color comparison as claimed in claim 1, including a series of tinted filters having means supporting them for movement in sequence into the light beams reflected to the photo-electric cell, and a device connected to said filters and operative by movement thereof to indicate the degree of filtration required to obtain color balance.

6. Means for color comparison as claimed in claim 1, wherein said means to regulate the amount of light passing to said standard material includes optical wedges in the beams of light passing to the respective compartments, said wedges being operable to adjust the light intensities of said beams to obtain accurate light balance on the compartments prior to the color test.

7. Means for color comparison as claimed in claim 1, wherein said means to regulate the amount of light passing to the standard material comprise optical screens formed as a circular group of entities mounted rotatably as a group for interposition individually in the light beam to the standard material.

8. Means for color comparison as claimed in claim 1, including an optical wedge between said light source and cage and formed as a straight line entity and having means for moving it to a position in the light beam to the material for test to obtain light balance in the optical system prior to test.

9. Means for color comparison as claimed in claim 1, wherein said means for rotating said circular cage revolves said cage at constant speed, and said windows in the compartments of said cage have staggered areas of reflection of such dimensions that the sum of the window areas of both compartments is the same in all axial planes.

10. Means for color comparison as claimed in claim 1, including a solid material container mounted to enter the compartment for the material for test, said container having a frontal contour to conform with the periphery of said compartment and having a front light admitting opening for light entry thereto from the windows of said compartment.

11. Means for color comparison as claimed in claim 1, wherein said indicating means are provided with means for producing, in combination with the photo-electric cell, alternations of sound of a frequency within the human audible range.

12. Means for color comparison as claimed in claim 1, including a removable cover for said cage, and a housing having a bridge piece opposite to said cover of the cage and on which one end of said cage is journaled, said bridge piece being movable from an operative position relatively to the cage to permit removal of said cover thereof.

13. Means for color comparison as claimed in claim 1, wherein said means for directing light from said source directs said light into parallel beams, and causes said parallel beams to impinge upon the windows of the respective compartments of the cage.

14. Means for color comparison as claimed in claim 1, wherein said light dividing and beam directing means includes a prism to receive the light from said light source and divide it into separate beams and reflectors to direct said beams in parallel paths, and further prisms to divert said parallel beams to the windows of the respective compartments.

15. Means for color comparison as claimed in claim 1, including a housing having inspection windows arranged in sequence in a common plane, rotary manipulative dials operatively connected to said means to regulate the amount of light passing to the standard material and enclosed in said housing, means operatively connected to said dials and cooperative with said inspection windows for indicating the adjustments of said light regulating means.

16. Means for color comparison as claimed in claim 1, wherein said indicating means comprises an audible sound indicator, and said electrical amplifying means for augmenting the alternating current response of said photo-electric cell comprises means for passing the currents from the photo-electric cell to the grid circuit of a sound amplifying device for said audible sound indicator, and at least one inter-coupled stage of amplification in advance of said audible sound indicator.

17. Means for color comparison as claimed in claim 1, wherein said electrical amplifying means for augmenting the alternating current response of said photo-electric cell comprises means for passing the currents from the photo-electric cell to the grid circuit of a valve amplifying device, and said indicating means comprises an electrical indicating device responsive to said amplified currents to denote variations thereof from the point of balance or nil indication.

18. Means for color comparison as claimed in claim 1, wherein said means to regulate the amount of light passing to the standard material comprise a plurality of obscuring screens mounted upon a rotatable disc and forming an optical wedge interposed in the light beam to the standard material, a star wheel rotatable with said disc, and a spring-pressed roller mounted for peripheral engagement with said star wheel to ensure accurate positioning of an obscuring screen on the disc in said light beam.

CECIL GEORGE LEMON.